United States Patent
Enomoto et al.

(10) Patent No.: US 6,866,961 B2
(45) Date of Patent: Mar. 15, 2005

(54) LITHIUM SECONDARY BATTERY AND MANUFACTURING METHOD THEREOF

(75) Inventors: Akio Enomoto, Chita-gun (JP); Kenji Kawamura, Nagoya (JP); Kenshin Kitoh, Nagoya (JP); Toshihiro Yoshida, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 261 days.

(21) Appl. No.: 09/819,329

(22) Filed: Mar. 28, 2001

(65) Prior Publication Data

US 2002/0006540 A1 Jan. 17, 2002

(30) Foreign Application Priority Data

Mar. 30, 2000 (JP) ........................................ 2000-094233
Feb. 14, 2001 (JP) ........................................ 2001-037737

(51) Int. Cl.[7] .............................. H01M 2/12; H01M 2/04
(52) U.S. Cl. .............................. 429/56; 429/53; 429/94; 429/175; 429/177; 29/623.2
(58) Field of Search .............................. 429/53, 54, 55, 429/56, 94, 164, 175, 177, 178; 29/623.2

(56) References Cited

U.S. PATENT DOCUMENTS

| | | | |
|---|---|---|---|
| 5,571,632 A | * 11/1996 | Teramoto | 429/94 |
| 6,344,292 B1 | 2/2002 | Nemoto et al. | 429/56 |
| 6,355,372 B2 | * 3/2002 | Yamahira et al. | 429/56 |
| 6,387,561 B1 | 5/2002 | Nemoto et al. | 429/51 |
| 6,468,692 B1 | * 10/2002 | Nemoto et al. | 429/174 |
| 2001/0049054 A1 | * 12/2001 | Enomoto et al. | 429/158 |

FOREIGN PATENT DOCUMENTS

| | | |
|---|---|---|
| EP | 895297 A1 * | 2/1999 |
| EP | 0 977 290 A1 | 2/2000 |
| EP | 1 059 681 A2 | 12/2000 |
| JP | 10-162801 | 6/1998 |
| JP | 10-284033 | 10/1998 |
| JP | 11-49217 | 2/1999 |
| JP | 11-049217 * | 2/1999 |

OTHER PUBLICATIONS

Patent Abstracts of Japan, Ishihara, Yoji et al., Nonaqueous Electrolyte Battery, Publication No. 06–187957, Date of Publication of application Aug. 7, 1994.

* cited by examiner

Primary Examiner—Jonathan Crepeau
(74) Attorney, Agent, or Firm—Burr & Brown (57) ABSTRACT

A lithium secondary battery has an internal electrode body formed by winding a positive electrode and a negative electrode on an outer peripheral wall of a hollow winding core and filled with nonaqueous electrolyte solution, a cylindrical battery case containing this internal electrode body 1 inside with its both ends being open, and electrode caps which each have a battery cap, an internal terminal, and an external terminal, the internal electrode body being sealed by the electrode caps at both open ends of the battery case. At least one of the electrode caps has a pressure release hole in a position corresponding with the center axis of the winding core.

12 Claims, 9 Drawing Sheets

LITHIUM SECONDARY BATTERY AND MANUFACTURING METHOD THEREOF

BACKGROUND OF THE INVENTION AND RELATED ART STATEMENT

The present invention relates to a lithium secondary battery (hereinafter also to be referred to simply as "battery") and to a manufacturing method thereof, and more particularly, relates to a lithium secondary battery which is superior in safety and productivity, and to a manufacturing method thereof which is simple and superior in productivity.

In recent years, a lithium secondary battery is widely used as a power source for electronic equipment such as portable communication equipment and a notebook-sized personal computer. In addition, demands for resource saving and energy saving are raised on the background of international protection of the earth environment, the lithium secondary battery is being developed as a motor driving battery for an electric vehicle and hybrid electric vehicle (hereinafter also to be referred to simply as "electric vehicle, etc.").

Figure 10:
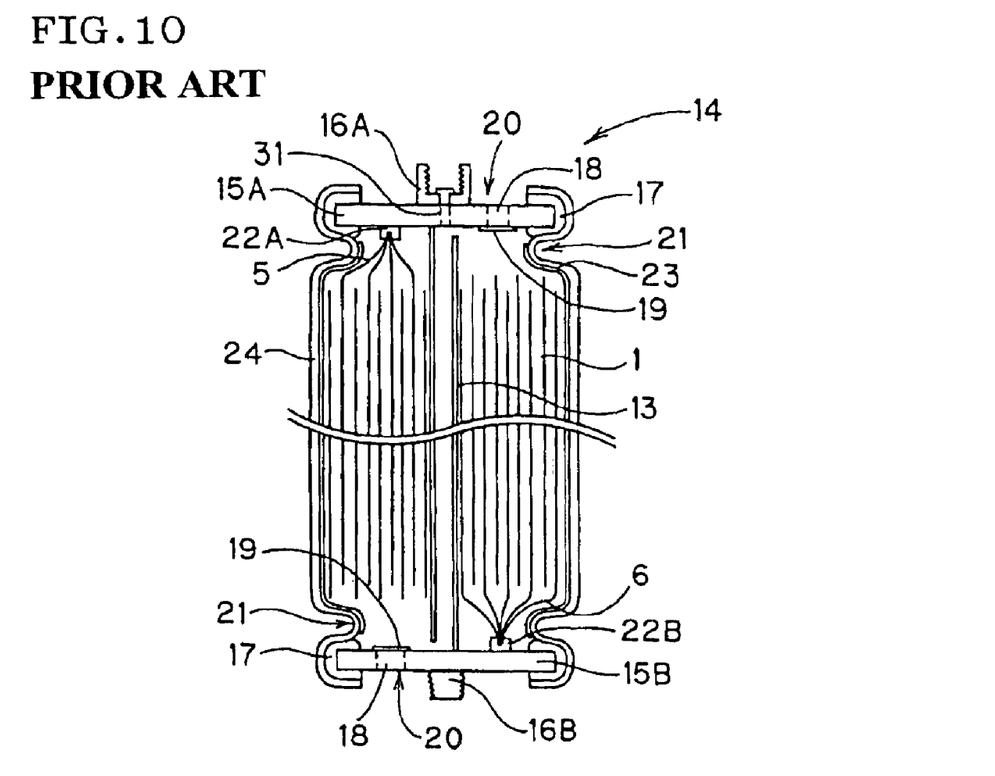
FIG. 10 is a sectional view showing an embodiment of a conventional lithium secondary battery.

This lithium secondary battery is advantageous in that it has high operating voltage and high energy density and can discharge a large current, but is inconvenient in that the rise of a battery temperature caused by abnormalities at the time of charging or discharging, for example, over-discharging due to a short circuit of external terminals, or over-charging due to malfunction of a charging device accompanies the rise of inner pressure resulting in a burst of the battery. Accordingly, the lithium secondary battery comprises a pressure release hole in an electrode cap being its component as a safety mechanism for preventing this burst, and on the inner periphery wall or at the end of the pressure release hole a pressure release valve is disposed. As shown in FIG. 10, conventionally this pressure release hole 18 is disposed in the vicinity of the outer periphery of the electrode cap apart from the central axis of the battery case 24.

However, the pressure release hole disposed in the vicinity of the outer periphery of the electrode cap must be disposed in both of the positive and the negative electrode caps, otherwise, insufficiency in releasing gasses from the center hollow portion of the winding core (which contains a lot of gases to cause inner pressure increase) makes it impossible to prevent the battery from bursting which used to be a problem. In addition, when a pressure release hole is disposed in the vicinity of the outer periphery of the electrode cap, electrolyte solution inlet must be disposed separately, and since the electrode cap requires two holes, the area of the portions to be sealed will become large, giving rise to aptness of leakage of the electrolyte solution, which used to be a problem.

Incidentally, the electrolyte solution inlet is disposed in a position of the electrode cap corresponding to the center axis of the winding core since injection of the electrolyte solution is implemented by inserting the injection nozzle into the center hollow portion of the winding core.

Figure 11:
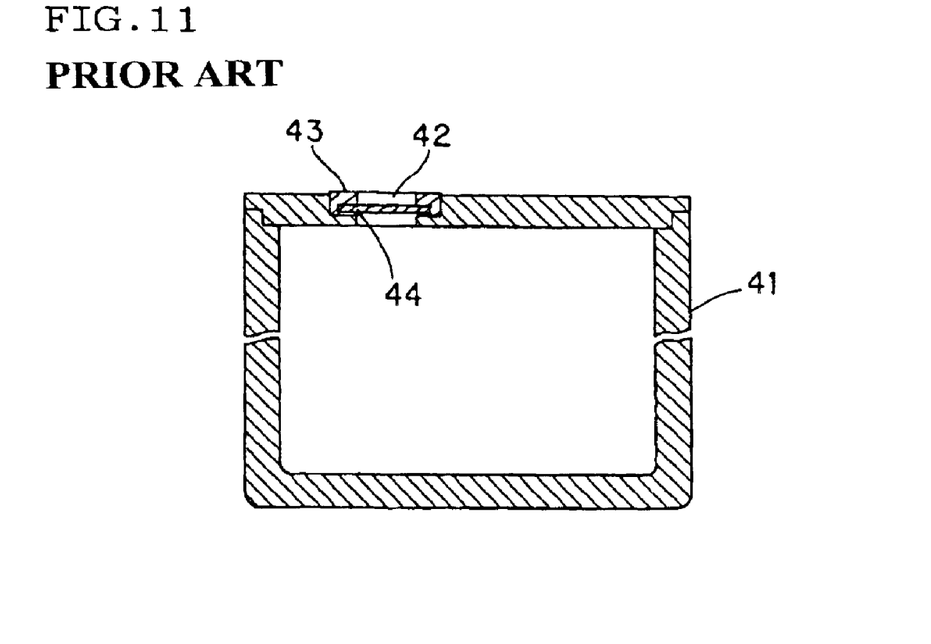
FIG. 11 is a sectional view showing another embodiment of the conventional lithium secondary battery.

In addition, conventionally, the pressure release valve is configured as shown in FIG. 11 by pressing an airtight ring 44 for fixing with a pressure fixing ring 43 where a hole 42 is provided in a battery case 41 (reference should be made to Japanese Patent Laid-Open No. 1 1-49217, etc.). However, Japanese Patent Laid-Open No. 11-49217 did not disclose any solving means such as particular shapes of components of the pressure release valve and the fixing pressure at the time of assembly and therefore was not sufficiently satisfactory in pressure release operation performance, although the weight of the battery can be reduced due to a decrease in the number of components.

The present invention was made in view of such conventional problems, and an object thereof is to provide a lithium secondary battery in which improvement in safety and productivity has been planned by disposing a pressure release hole in an electrode cap in a position corresponding to the center axis of the winding core, and improving pressure release operation performance and assembly operation performance of the pressure release valve.

In addition, another object of the present invention is to provide a method of manufacturing a lithium secondary battery which is simple for manufacturing and in which improvement in productivity has been achieved by structuring the electrode cap simply.

SUMMARY OF THE INVENTION

According to the present invention, there is provided a lithium secondary battery comprising an internal electrode body formed by winding a positive electrode and a negative electrode on an outer periphery wall of the hollow cylindrical winding core and filling with nonaqueous electrolyte solution, a cylindrical battery case containing the internal electrode body inside with its both ends being open, a battery cap, internal terminals, and external terminals, and comprises electrode caps which have sealed the above described internal electrode body at both open ends of this battery case, wherein at least one of the electrode caps has a pressure release hole in a position corresponding to the center axis of the winding core.

The center axis of the winding core preferably overlaps the center axis of the battery case, and the external terminals are made to comprise a center hollow portion so that this center hollow portion functions as a pressure release path of the pressure release hole.

In the lithium secondary battery of the present invention, in the case where the capacity (C) of the internal electrode body is not less than 2 Ah, the sectional area ($S_1$) of pressure release hole as well as the sectional area ($S_2$) of the center hollow portion of the winding core are preferably larger than 0.3 ($cm^2$), and the winding core preferably has thickness of not less than 0.8 mm. In addition, the values given by dividing the pressure release hole's sectional area ($S_1$) and the winding core's center hollow portion's sectional area ($S_2$) by the internal electrode body's battery capacity (C) respectively ($S_1/C$ and $S_2/C$) are both preferably larger than 0.02 ($cm^2/Ah$), and the size of the winding core's center hollow portion's sectional area ($S_2$) is preferably not less than the above described pressure release hole's sectional area ($S_1$). Moreover, the winding core is preferably made of aluminum or an aluminum alloy.

In addition, according to the present invention, there is provided a lithium secondary battery which has an internal electrode body formed by winding a positive electrode and a negative electrode on an outer periphery wall of the hollow cylindrical winding core and dipping into nonaqueous electrolyte solution, a cylindrical battery case containing the internal electrode body inside with its both ends being open, battery caps at least one of which has a pressure release hole and which seal the above described internal electrode body at both open ends of this battery case, wherein a pressure release valve is disposed on the internal peripheral wall of or at the end of the above described pressure release hole with the elastic body and the metal foil being brought into pressure contact with a spacer to seal the above described battery case.

The metal foil is preferably formed so as to have the surface pressure of not less than 980 kPa. The spacer is preferably formed with a metal material having a Young's modulus not less than 170 GPa, and is preferably a ring member having a stopper structure in order that the stress not less than a constant amount will not be applied to the ring member or the above described elastic body. Moreover, the metal foil is preferably made of Al, Cu, Ni, or alloys containing them respectively that is coated by the fluoride resin.

In the lithium secondary battery of the present invention, the pressure contact force applied to the elastic body is preferably not less than 980 kPa and not more than the force amount to cause the elastic body to maintain elasticity maintenance percentage of not less than 95%, and the elastic body is preferably a packing processed in advance to a predetermined size. In particular, the packing is preferably made of ethylene propylene rubber, polyethylene, polypropylene or fluoride resin. In addition, the electrode cap preferably comprises a pressure release hole in a position corresponding to the winding core's center axis. Moreover, the pressure release hole is preferably commonly used as the electrolyte solution inlet.

In addition, according to the present invention, there is provided a lithium secondary battery which has an internal electrode body formed by winding a positive electrode and a negative electrode on an outer peripheral wall of the hollow cylindrical winding core and dipped into nonaqueous electrolyte solution, a cylindrical battery case containing the internal electrode body inside with its both ends being open, and electrode caps which have sealed the above described internal electrode body at the both open ends of this battery case, wherein the above described electrode caps are formed in approximately rotary symmetry around the center axis of the above described battery case.

The lithium secondary battery of the present invention suitably has a battery capacity of not less than 2 Ah. The present invention can be suitably used as a battery to be mounted on vehicles, and for an engine starter, and moreover can be suitably used for an electric vehicle or a hybrid electric vehicle.

In addition, according to the present invention, there is provided a method of manufacturing a lithium secondary battery, which comprises: preparing a plate-like member functioning as a cap after production, an elastic body, a metal foil and a spacer which are processed in advance to a predetermined size; disposing said elastic body and said metal foil in a predetermined position; combining them with said spacer to form a pressure release hole unit; fitting said pressure release hole unit into said plate-like member to produce an electrode cap; preparing a second electrode cap; positioning an internal electrode body in a battery case; and sealing the battery case with said electrode caps.

BRIEF DESCRIPTION OF THE DRAWINGS

FIG. 2(a) is normal time, FIG. 2(b) is after pressure release, FIG. 2(c) is in the case of moving to the end surface of the battery case, and FIG. 2(d) is in the case where the pressure release hole is provided at the end of the electrode cap.

FIGS. 8(a)–(e) are explanatory views showing some kinds of structures of electrode caps to be used in the lithium secondary battery of the present invention.

DETAILED DESCRIPTION OF PREFERRED EMBODIMENT

The present invention is roughly divided into first to fourth aspects. Incidentally, the first to third aspects relates to a lithium secondary battery, and the fourth aspect relate to a manufacturing method of the lithium secondary battery. As follows, embodiments of the present invention on respective aspects will be described, but it goes without saying that the present invention is not limited to those embodiments.

Figure 1:
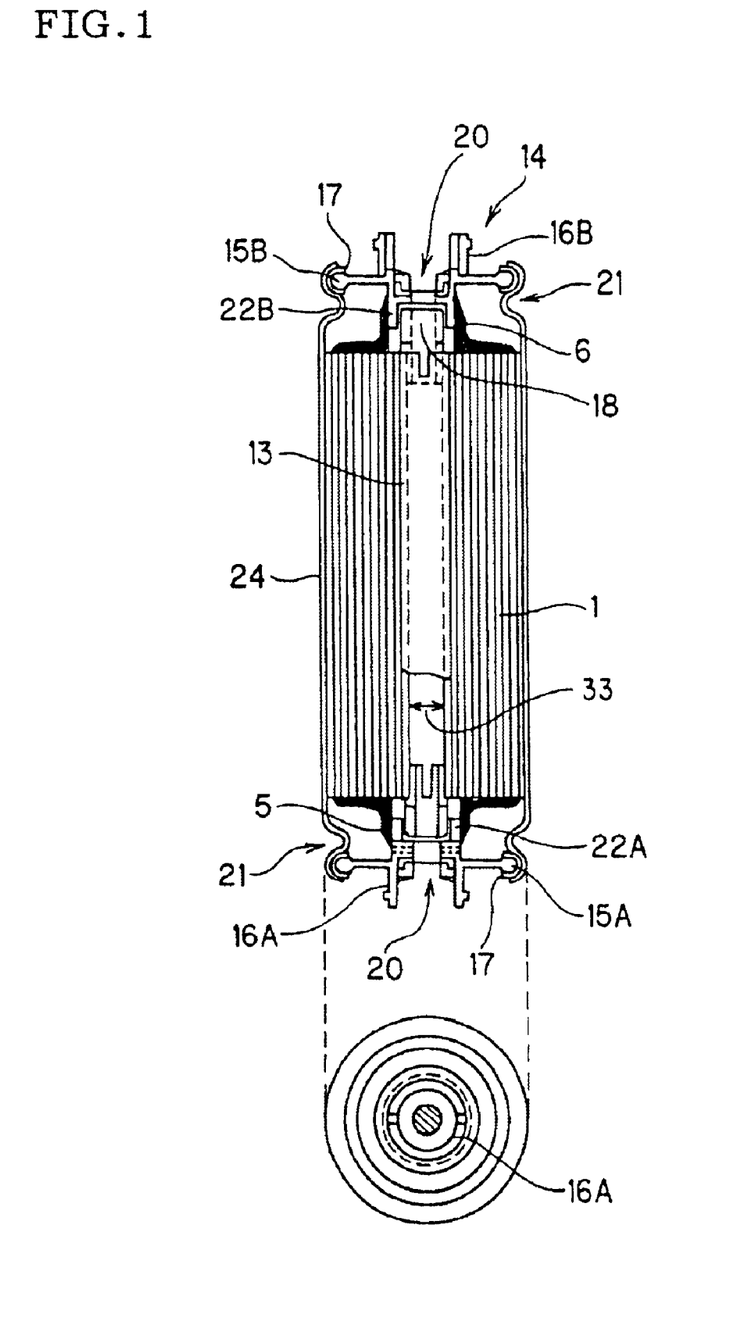
FIG. 1 is a sectional view showing an embodiment of a lithium secondary battery of the present invention.

A lithium secondary battery of the first aspect of the present invention is a lithium secondary battery which has an internal electrode body formed by winding a positive electrode and a negative electrode on an outer peripheral wall of the hollow cylindrical winding core and filling with nonaqueous electrolyte solution, a cylindrical battery case containing this internal electrode body inside with its both ends being open, a battery cap, internal terminals, and external terminals, and comprises electrode caps which have sealed the above described internal electrode body at both open ends of this battery case, and at least one of the electrode caps is configured by comprising a pressure release hole in a position corresponding to the center axis of the winding core. As shown in FIG. 1, if the winding core 13, which is hollow in the center, is disposed in the center of the battery case 24 with the pressure release hole 18 being a pressure release hole disposed in an extended position of the center axis of the winding core, the inner pressure can be reduced extremely swiftly. This serves to make it possible to prevent the burst of the battery with a pressure release hole being disposed at least on only one of the electrode caps. Accordingly, although pressure release holes conventionally used to be disposed in both the positive and negative electrode caps, a pressure release hole in either one will be sufficient, and the structure of one electrode cap which does not require a pressure release hole will become further simpler so that manufacturing costs can be reduced. Of course, pressure release holes may be disposed in both the positive and negative electrode caps in the present invention.

In this case, the center axis of the winding core preferably overlaps the center axis of the battery case. This serves to make it possible to release the internal pressure of the battery most swiftly and to prevent the battery from bursting. In addition, the external terminals are made to comprise a center hollow portion so that this center hollow portion functions as a pressure release path of the pressure release hole. This serves to make it possible to hold the pressure release function and adopt simpler structure of the electrode cap. As shown in FIG. 1, in the lithium secondary battery 14, if the wound-type internal electrode body 1 is disposed in the center of the battery case, the winding core 13 is positioned in the center of the electrode cap. In this case, the position of the pressure release hole is disposed in the center of the electrode caps so that the pressure release hole can be structured in an integrated fashion easily for the pressure release hole together with its external terminal. In order to integrate the external terminal with the pressure release hole, the pressure release valve provided at the pressure release hole must be realized to have a structure that is simple and has pressure release operation performance so as to be contained inside the external terminal. The present invention is the one that has realized this and simplified the structure of the electrode cap as a whole.

Figure 2A:
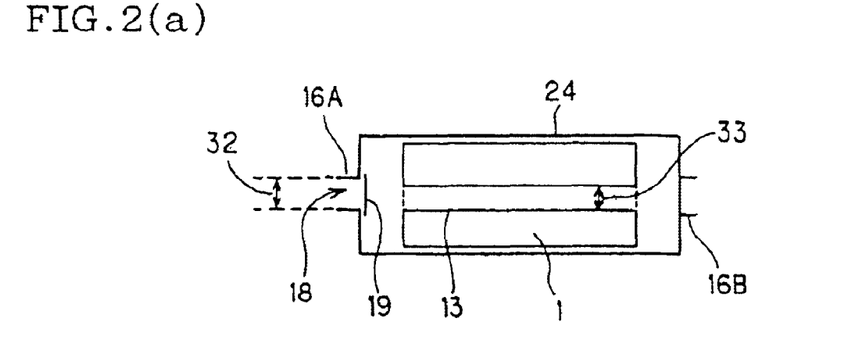
FIGS. 2(a)–(d) are explanatory views showing an example of movement of the internal electrode body in the case where a battery suffering from abnormal inner pressure conducts pressure release.
Figure 2B:
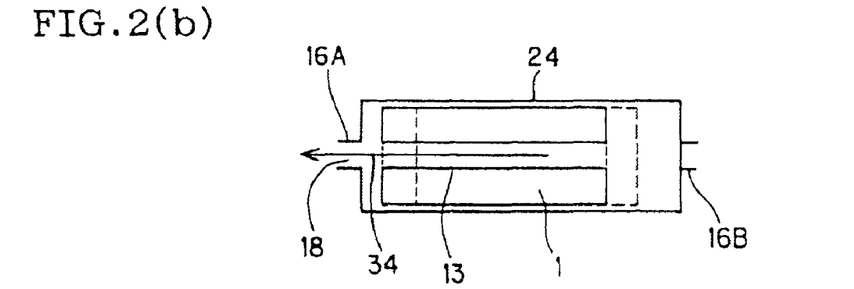

In addition, in the first aspect of the invention, it is preferable that the capacity (C) of the internal electrode body is not less than 2Ah, and the sectional area ($S_1$) of pressure release hole as well as the sectional area ($S_2$) of the hollow portion of the winding core are larger than 0.3 ($cm^2$). A battery with capacity of not less than 2Ah gives rise to a large quantity of gas at the time when abnormality in battery reaction such as short circuit, etc. has taken place. As shown in FIG. 2(a) and FIG. 2(b), in the case where the pressure release hole is provided in only one of the electrode caps, the winding core hollow portion will be the main pressure release path, and the result of an embodiment to be described later has revealed that also the battery with capacity of not less than 2 Ah can implement pressure release without any problem if the pressure release hole's sectional area 32 and the winding core hollow portion's sectional area 33 are both larger than 0.3 ($cm^2$).

Here, "pressure release hole's sectional area" refers to, as shown in FIGS. 2(a)–(d), the sectional area of the end portion the pressure release hole being an opening of the pressure release hole which is visible at the time when the electrode cap was viewed from the internal side of the battery.

In addition, in the first aspect of the invention, the winding core preferably has thickness of not less than 0.8 mm. For example, in the case where a nail and the like is stuck onto a battery and the battery is short-circuited, and moreover, the nail is stuck in such a fashion to pierce the winding core, small winding core hollow portion could clog the pressure release path, giving rise to a state in which burst is apt to take place depending on gas pressure in the end surface side of the battery where no pressure release hole is provided. In order to prevent this, the later-described nail piercing tests were implemented to reveal that the flesh thickness of the winding core of not less than 0.8 mm enables pressure release without any problems.

In addition, the values given by dividing the pressure release hole's sectional area ($S_1$) and the winding core's center hollow portion's sectional area ($S_2$) by the internal electrode body's battery capacity (C) respectively ($S_1$/C and $S_2$/C) are both preferably larger than 0.02 ($cm^2$/Ah). In the case where that value is smaller than 0.02, that is, in the case where the pressure release hole's opening area as well as the winding core hollow portion's sectional area are smaller than the battery capacity, at the time when the internal pressure of the opening is released, members configuring the internal electrode body and the like cause clogging and thereby insufficient pressure release which might result in accidents such as battery's burst or burning and is not preferable. In addition, in order to secure swift pressure release ability, pressure release area not less than a constant area is necessary. According to such a lithium secondary battery of the present invention, even in the case where overcharge due to not only the internal short circuit but also external short circuit and the like results in increase in the battery temperature and in increase in the battery's internal pressure, since the pressure release mechanism being a pressure release hole is disposed in an appropriate shape matching the battery's capacity, a burst of the battery in its entirety and explosion do not take place, but will provide excellent safety.

Moreover, the size of the winding core's center hollow portion's sectional area ($S_2$) is preferably not less than the pressure release hole's sectional area ($S_1$). This reflects consideration on the flow of gas at the time of pressure release and the pressure balance. As shown in FIG. 2(a), in the case with one side pressure release hole, the gas 34 at the side without the pressure release hole undergoes pressure release through the center hollow portion of the winding core. Thus, smooth pressure release through the center hollow portion of the winding core will be indispensable. Firstly, the sectional area of the pressure release hole itself determines safety at the time of pressure release. In the case where the pressure release hole's sectional area is small, even if the winding core's center hollow portion's sectional area is not less than the pressure release hole's sectional area, the internal pressure is not smoothly released, and the battery is endangered to burst. In addition, also for the case where the winding core's center hollow portion's sectional area is small, the fact that the winding core's center hollow portion's sectional area is not less than the pressure release hole's sectional area will not make any difference. Accordingly, when the pressure release hole's sectional area and the winding core center hollow portion's sectional area are both larger than 0.3 ($cm^2$), and moreover the winding core's center hollow portion's sectional area is not less than the pressure release hole's sectional area, the winding core's center hollow portion's gas 34 flows sufficiently and results in a state that the area of the pressure release hole itself controls speed to provide the preferable pressure release function.

Figure 2C:
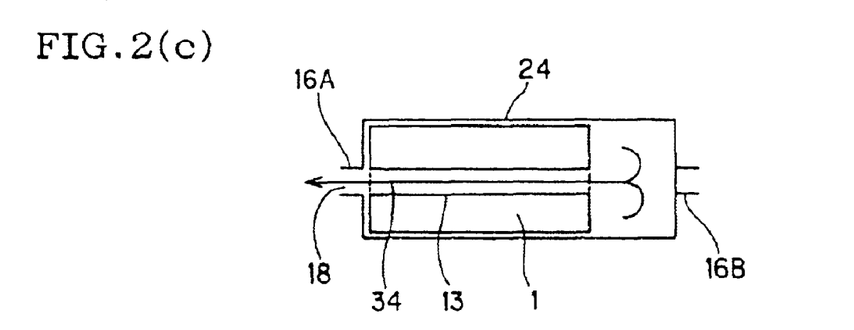
Figure 2D:
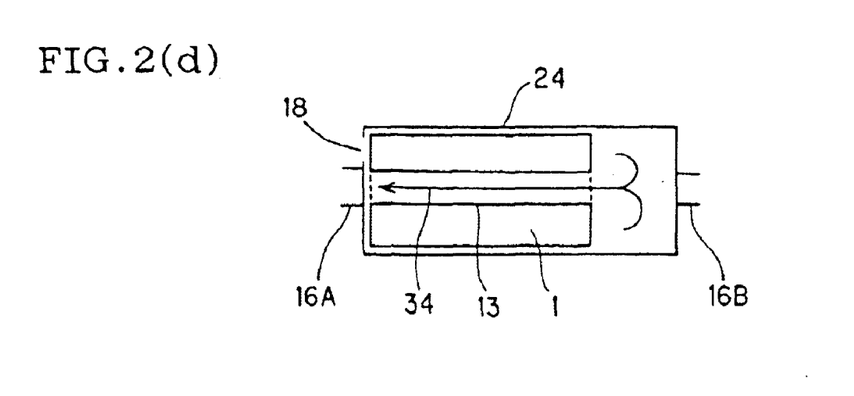

Incidentally, at the time of pressure releasing, as shown in FIG. 2(c), in the worst case, even if the internal electrode body has moved to the battery's end portion, as in the present invention, the pressure release hole being provided in the center of the electrode cap and in the extended position of the winding core axis secures the pressure release path firmly, so that the burst due to increase in the battery's internal pressure can be prevented as much as possible. As shown in FIG. 2(d), in the case where the pressure release hole is provided at the end of the electrode cap, the movement of the internal electrode body will clog the pressure release hole, giving rise to an increase in internal pressure and a burst.

In addition, the winding core is preferably made of aluminum or an aluminum alloy. The reason is that these substances have appropriate hardness and a good molding nature.

Next, the second aspect of the present invention will be described. A lithium secondary battery of the second aspect of the present invention is a lithium secondary battery which has an internal electrode body formed by winding a positive electrode and a negative electrode on an outer periphery wall of the hollow cylindrical winding core and filling with nonaqueous electrolyte solution, a cylindrical battery case containing this internal electrode body inside with its both ends being open, electrode caps at least one of which has a pressure release hole and which seal the above described internal electrode body at both ends of this battery case, and is configured by disposing a pressure release valve on the internal periphery wall of or at the end of the pressure release hole with an elastic body and the metal foil being brought into pressure contact with a spacer to seal the battery case. Since such a simple pressure release valve structure performs well in assembly work, costs for the lithium secondary battery can be reduced.

In this case, the metal foil is preferably formed so as to have the surface pressure of not less than 980 kPa. Control on this surface pressure leads to control on the pressure contact force toward each component of the pressure release valve, and actually since the metal foil seals the battery case, its air-tightness will become securable.

The lithium secondary battery for a hybrid electric vehicle and the like releases a large current and the like, and therefore, the battery temperature might increase and the interior of the battery could be excessively highly pressurized and therefore, a high-performance pressure release valve will become necessary. The temperature is low around −40° C. when the lithium secondary battery of the present invention is actually used, and therefore, also for the pressure release valve, substance quality of the component of a spacer, an elastic body, and a metal foil as well as the pressure release valve's function efficiency as a whole under working temperature of the lithium secondary battery will become a problem.

Under the circumstances, in the present invention, a spacer is preferably formed with a metal material having a Young's modulus not less than 170 GPa. This is for avoiding the spacer's expansion and contraction refraining from applying sufficient pressure to the elastic body as well as the metal foil at the time when pressure contact and fixing are implemented with pressure insertion of the spacer.

Figure 3:
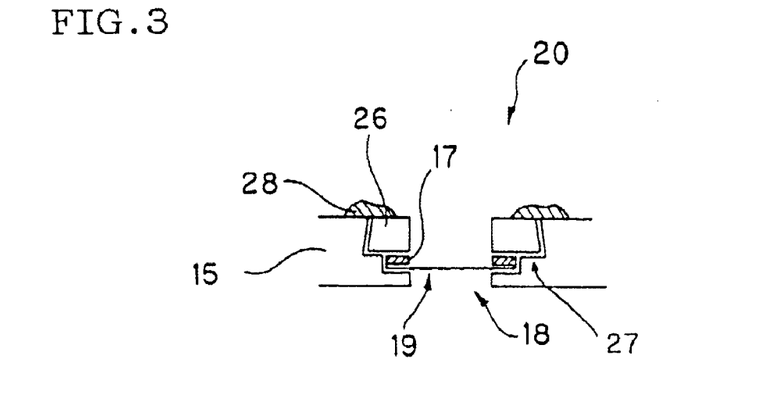
FIG. 3 is a sectional view showing an embodiment of structure of a pressure release valve suitably used for the lithium secondary battery of the present invention.
Figure 4:
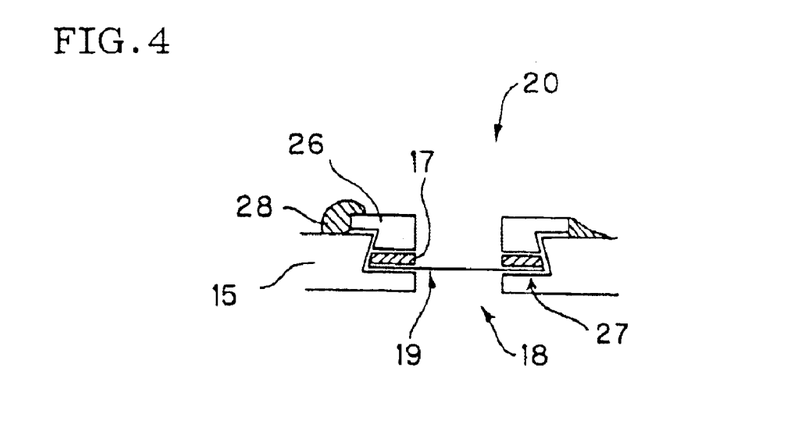
FIG. 4 is a sectional view showing another embodiment of structure of a pressure release valve suitably used for the lithium secondary battery of the present invention.

Moreover, a spacer is preferably a ring member or a ring member having stopper structure in order that the stress not less than a constant amount will not be applied to the elastic body. The electrode cap is, as shown in FIG. 3, designed so that a spacer is pressed for insertion with an angle from the upper portion of the pressure release hole 18 to the lower portion thereof to bring the elastic body as well as the metal foil into pressure contact and fixing and an appropriate surface pressure is applied to the metal foil. In addition, as shown in FIG. 4, the reason why the spacer 26 comprises a stopper structure is for making sure that the spacer shall not be pushed into inside the pressure release hole to a degree not less than necessary and no pressure to an excess degree shall applied to the elastic body and the like to be broken.

These spacers, which are shaped as rings, are further preferably given a curvature processing at the internal edge portion of the spacers in order to maintain the function of the elastic body as well as the metal foil being the adjacent components without damaging them. In this case, if the curvature radius at the internal edge portion of the spacer is not less than 30 μm which is not more than a half of the spacer's thickness, the function of the pressure release hole can be maintained without any problems.

In addition, in the second aspect of the invention, for a metal foil, ones made of Al, Cu, Ni, or alloys containing them respectively that are coated by the fluoride resin are suitably used. The metal foil, which will be brought into direct contact with electrolyte solution, is preferably highly pure and excellent in anti-corrosion against electrolyte solution for use, and one having surfaces coated with fluoride resin should be used to provide improvement in tolerance and excellent safety.

Moreover, in the second aspect of the invention, the pressure contact force applied to the elastic body is preferably not less than 980 kPa and not more than the force amount to cause the elastic body to maintain elasticity maintenance percentage of not less than 95%. This enables the surface pressure of the metal foil to be secured and the air-tightness to be maintained so that leakage of the electrolyte solution is prevented. At this time, as the elastic body, an elastic body processed in advance to a predetermined size, that is, packing is preferably used, and as materials in particular, ethylene propylene rubber, polyethylene, polypropylene or fluoride resin are nominated. These resins are excellent in anticorrosion, and even if the nonaqueous electrolyte solution containing an organic solvent of an ester system is used, reliability is secured.

The elasticity maintenance percentage of the elastic body is expressed by changes in thickness before and after the pressure contact force has been applied with an autograph to an elastic body of 'for example' the outer diameter of 10 mmφ×the inner diameter of 7 mmφ×1 mm, that is, when the pressure contact force is released after a predetermined time lapse. That is, the elasticity maintenance percentage D of the elastic body is given by $D=B_1/A_1 \times 100$ with $A_1$ being thickness of the elastic body prior to application of the pressure contact force and $B_1$ being thickness of the elastic body after application of the pressure contact force.

Figure 6A:
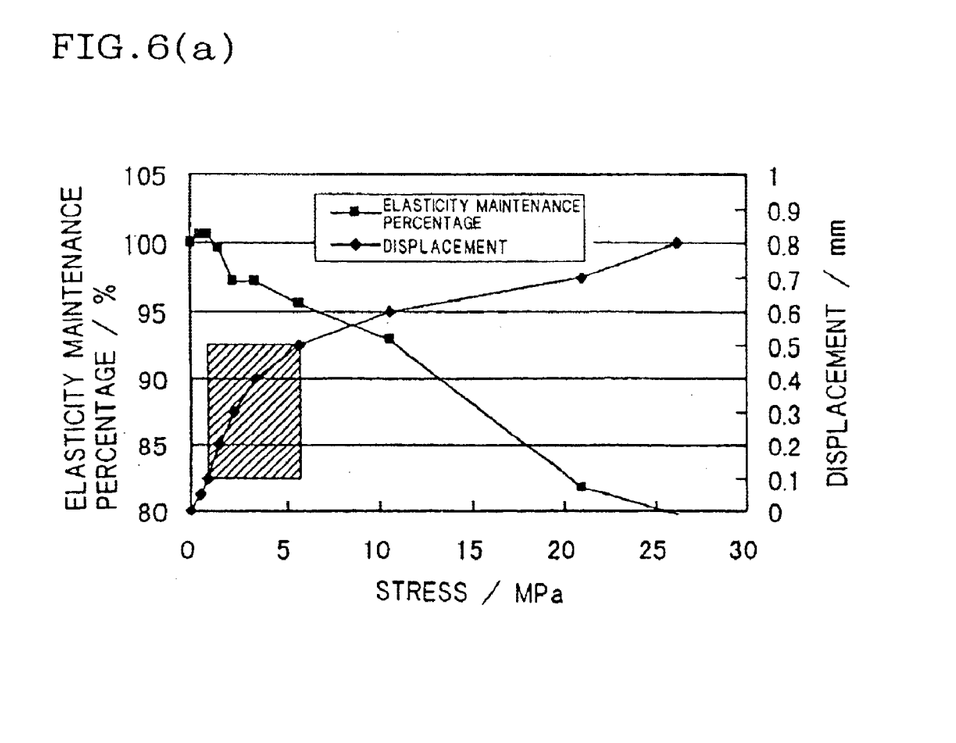
FIGS. 6(a)–(d) are graphs showing relationship between elasticity maintaining ratio as well as displacement on various kinds of elastic substance.
Figure 6B:
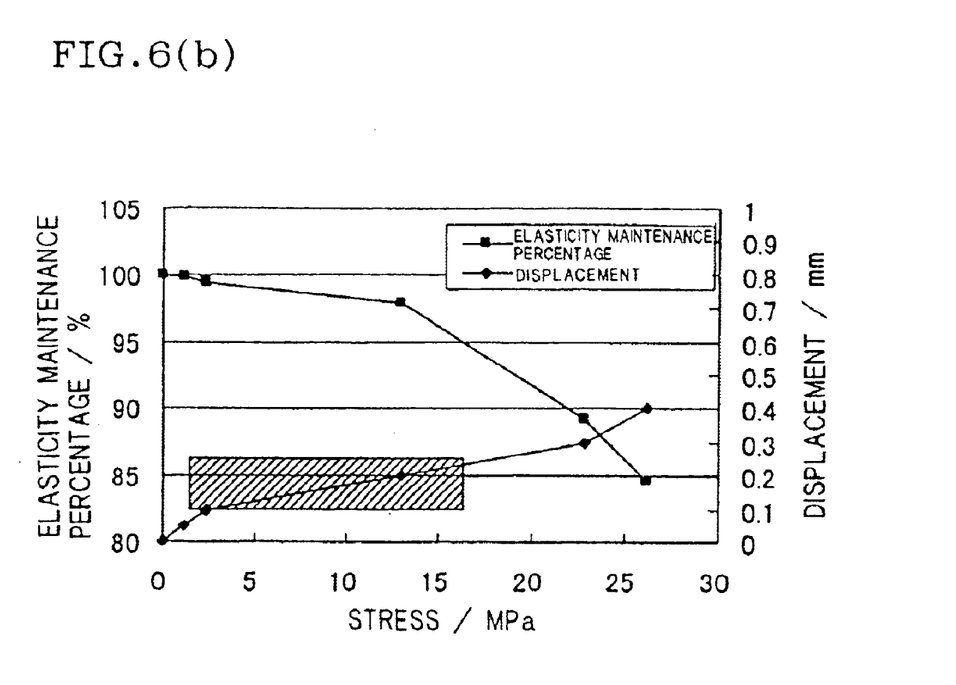
Figure 6C:
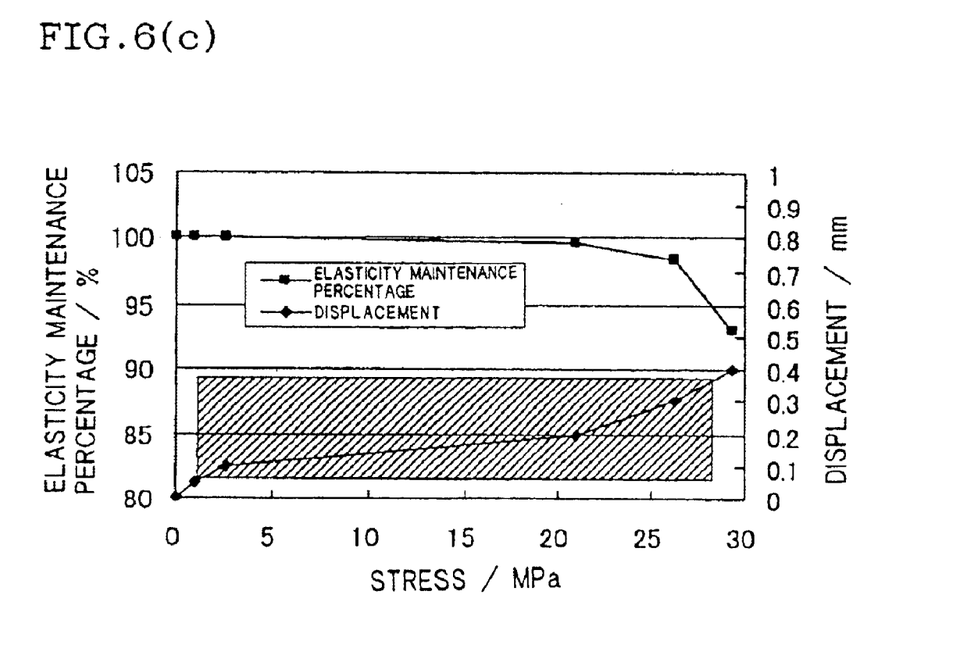
Figure 6D:
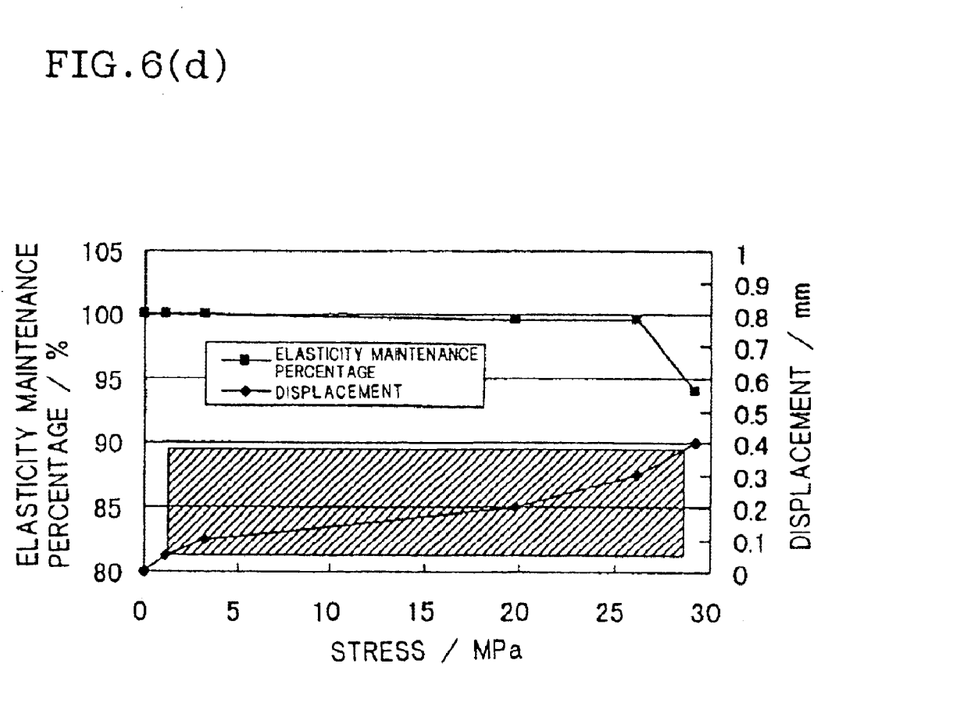

FIGS. 6(a) to 6(d) are graphs describing the elasticity maintenance percentage and the displacement by way of relationship with the applied pressure contact force with regard to the respective elastic bodies (FIG. 6(a): ethylene propylene rubber, FIG. 6(b): fluoride resin, FIG. 6(c): polyethylene, and FIG. 6(d):polypropylene) each of which has been processed to the outer diameter of 10 mmφ×the inner diameter of 7 mmφ×1 mm, and the shaded frame portions shown in respective drawings are the suitable ranges related to the above described present invention, and are the regions where good surface pressure can be obtained. That is, if the pressure contact force to be applied to the elastic body is not less than 980 kPa, and the elasticity maintenance percentage is not less than 95%, the elasticity is secured as well as the surface pressure is secured, giving rise to such a pressure contact force that no leakage will take place from the pressure release hole with or under the pressure which operates the pressure release valve.

Next, the pressure release valve disposed in the above described electrode cap will be described in detail. FIG. 3 is an enlarged sectional view showing the structure of the pressure release valve 20 shown in FIG. 1. The pressure release valve 20 is configured by comprising a metal foil 19, the elastic body 17, and a ring-form metal spacer 26 in order from the lower portion of the battery cap 15. This is a basic configuration in the present invention, but also in this case, the electrode cap is inclined with a degree, and in order to control the deformation amount of the elastic body homogeneously, the stopper portion 27 is provided to the battery cap 15 so that the spacer 26 is not structured to be pushed into the side of the elastic body 17 in not less than a predetermined amount. This serves to make it possible that the appropriate stress to the elastic body and the necessary surface pressure of the metal foil is secured and the air tightness of the pressure release valve 20 is maintained. At this occasion, the metal spacer is further preferably fixed with an adhesive agent 28 in order to secure air tightness firmly also under a low temperature to be used. For this adhesive agent, an aerobic adhesive agent is suitably used.

Another embodiment of the pressure release valve is shown in FIG. 4. The pressure release valve 20 is configured by comprising a metal foil 19, the elastic body 17, and a ring-form metal spacer 26 having stopper structure in order from the lower portion of the battery cap. In this case, the surface pressure applied to the metal foil 19 is controlled more firmly so as to enhance its function as a pressure release valve. That is, the present invention is under the state that the packing being an elastic body is pressured and flattened, or stress is being applied to the elastic body all the time, and if it is applied to an excess degree, elasticity will be gone and function as the pressure release valve as a whole will be lost. Therefore, a reception portion on the stress has been created so that the stress has been controlled to not more than a predetermined amount more firmly.

Figure 5:
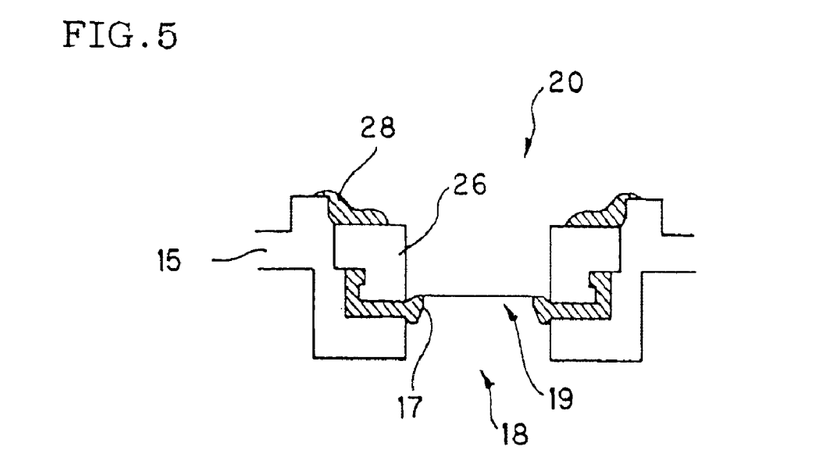
FIG. 5 is a sectional view showing a still another embodiment of structure of a pressure release valve suitably used for the lithium secondary battery of the present invention.
Figure 7:
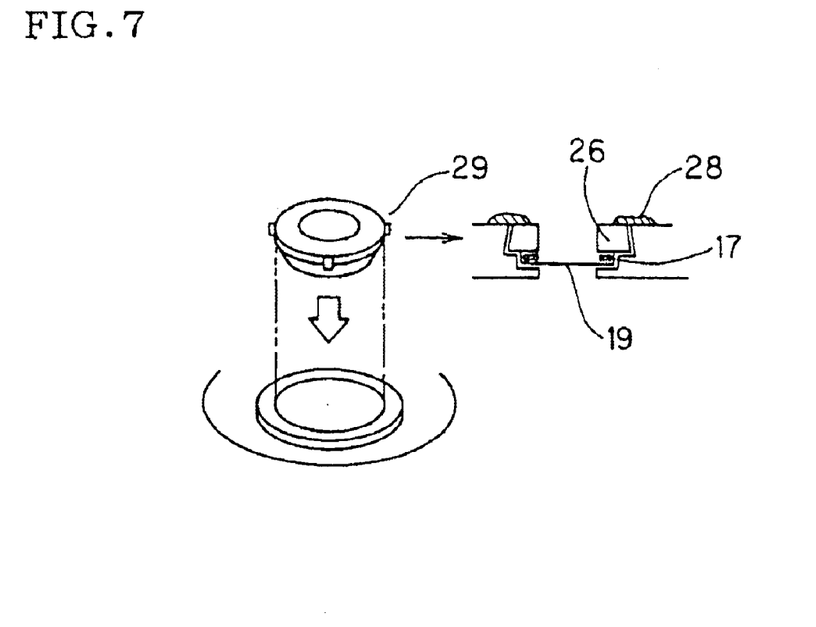
FIGS. 7(a) and 7(b) show a perspective view and a sectional view, respectively, showing an embodiment of a component of a pressure release valve suitably used for the lithium secondary battery of the present invention.
Figure 7A:
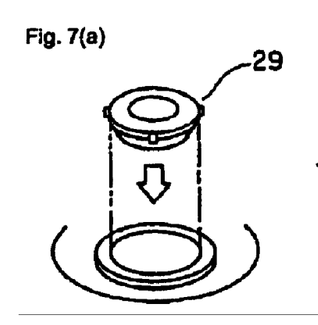
Figure 7B:
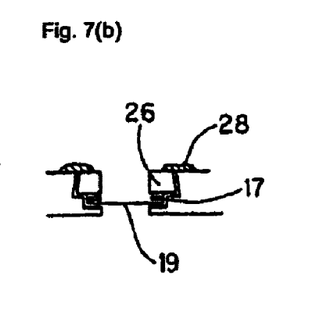

Another embodiment of the pressure release valve is shown in FIG. 5. The pressure release valve 20 is configured by comprising the elastic body 17, a metal foil 19, and a ring-form metal spacer 26 having stopper structure in order from the lower portion of the electrode cap. Thus, configuration by comprising the metal foil 19 sandwiched between the elastic body 17 and the metal spacer 26C is realizable, and this combination, as shown in FIGS. 7(a) and 7(b), enables the respective components of the pressure release valve to be integrated in advance as a pressure release hole unit 29.

In the case where the above described pressure release valves of FIGS. 3, 4 and 5 are used, for any of the cases, in the state of the single body of the electrode cap prior to assembly of the battery, with only the metal foil and the elastic body being mounted, and with the metal spacer being inserted by pressure and the like the pressure release hole 18 comprising the pressure release valves having pressure release operating nature can be formed to make it possible to attain excellent effects such as further reduction in equipment costs, simplification of assembly work, and improvement in manufacturing yield factor.

Moreover, in the second aspect of the invention, the electrode cap preferably comprises a pressure release hole in a position corresponding to the winding core's center axis. Thus, the pressure release hole having the above described pressure release valve is disposed in the electrode cap in an extended position of the center axis of the winding core so that pressure release can be implemented efficiently as in the first aspect of the invention.

In addition, in the first and the second aspects of the invention, the pressure release hole is preferably commonly used as the electrolyte solution inlet. In the first and the second aspect of the invention, the pressure release hole is disposed in the center of the electrode cap so that, as described later the pressure release hole can be used as an electrolyte solution inlet That is, as shown in FIG. 1, the pressure release hole is integrated with the external terminal and is disposed in the center of the electrode cap, and moreover the internal electrode body's winding core is disposed in the center of the battery so that the electrolyte solution can be injected with that pressure release hole. This serves to make it possible to shorten time for injecting the electrolyte solution, to reduce loss in the electrolyte solution, to reduce the hole's area in the battery, and thus to largely reduce the probability of leakage of the electrolyte solution.

Figure 9:
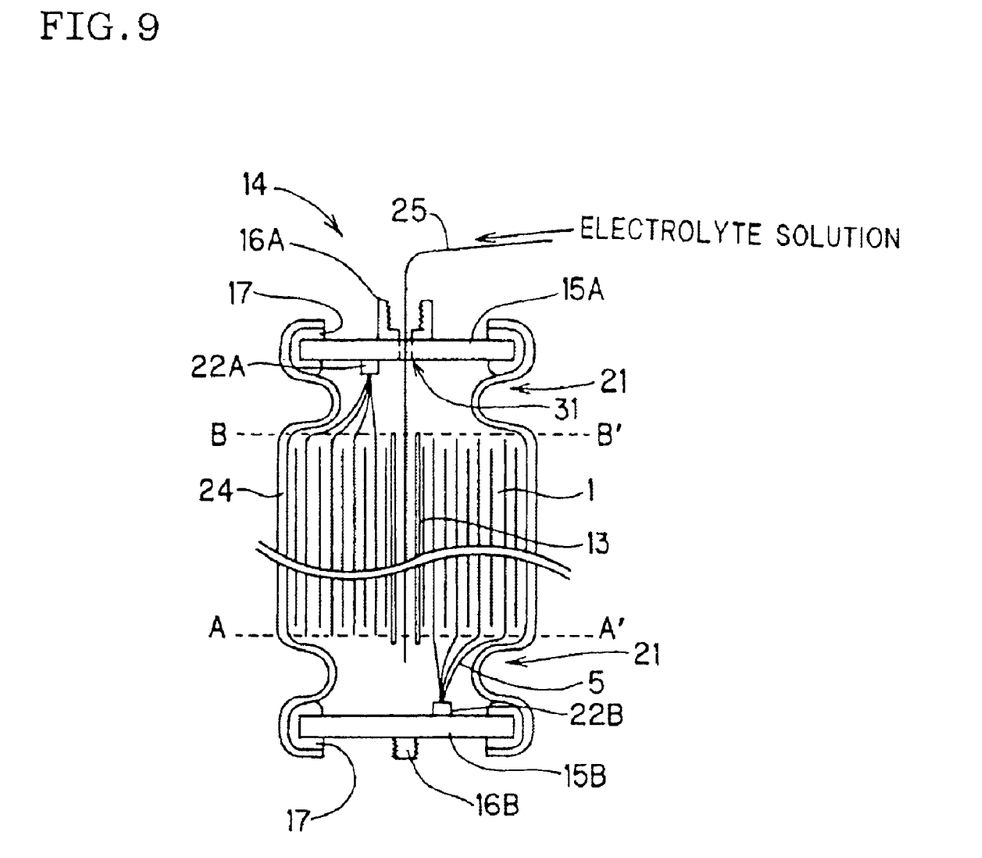
FIG. 9 is a sectional view showing an electrolyte solution filling method and a form of an electrode cap of the lithium secondary battery of the present invention.

As for that electrolyte solution injection method, as shown in FIG. 9, one uses the pressure release hole as the electrolyte solution inlet 31 prior to sealing the battery case 24 with it by inserting the electrolyte solution injection nozzle 25 into the center hollow portion of the winding core 13. Adoption of this method serves to make it possible to insert the tip of the electrolyte solution injection nozzle 25 into the other end of the battery 14 so that the electrolyte solution is injected well. In this occasion, the battery 14 is disposed in a space such as a glove box and the like where the atmosphere can be adjusted. When the interior of the glove box, etc. is evacuated with a vacuum pump, the battery 14 is in a state that the pressure release hole is used as an electrolyte inlet, and therefore the interior of the battery 14 will be in a vacuum. Here, the vacuum level is preferably made to enter the state of vacuum higher than around 0.1 torr (13.3 Pa).

Under this state, the tip of the nozzle 25 is inserted through the electrolyte inlet 31, and subsequently through the center hollow portion of the winding core 13 to reach the position of the end surface of the internal electrode body 1 in the bottom side of the battery, that is, the position indicated by the broken line AA' in FIG. 9, and thereafter the electrolyte solution is injected until the internal electrode body 1 is filled, that is, to the position indicated by the broken line BB' in FIG. 9. Here, insertion of tip of the nozzle 25 to reach the lowest portion inside the battery 14 can prevent the electrolyte solution from splashing so as to start dipping into the electrolyte solution the internal electrode body 1 from the end surface of the bottom surface portion without fail.

Incidentally, during the dipping process of the electrolyte solution, the vacuum level is preferably maintained approximately in such a degree that the electrolyte solution will not boil, and the vacuum level at this time largely depends on the nature of the solvent composing the electrolyte solution being used. In addition, as the material quality for the injection nozzle 25, metals or resins which will not undergo corrosion by the electrolyte solution are used, and the injection nozzle 25 is connected with the electrolyte reserve tank disposed outside the glove box, etc. via a tube or a pipe, etc. so that the electrolyte is transported from the electrolyte reserve tank with a quantitative pump, etc.

Thus, the battery 14 is filled with the electrolyte solution from the follower portion so that the internal electrode body 1 is filled from the lower portion to the upper portion, bubbles generated from the internal electrode body 1 can come out through the space which is not filled with electrolyte solution, filling by the electrolyte solution will be able to be implemented efficiently. Thus, injection time of the electrolyte solution can be shortened, and in this case, even in the case where a highly volatile solvent is contained in the electrolyte solution, its evaporation quantity can be suppressed to the smallest limit so as to prevent the electrolyte solution's performance from dropping.

Figure 8A:
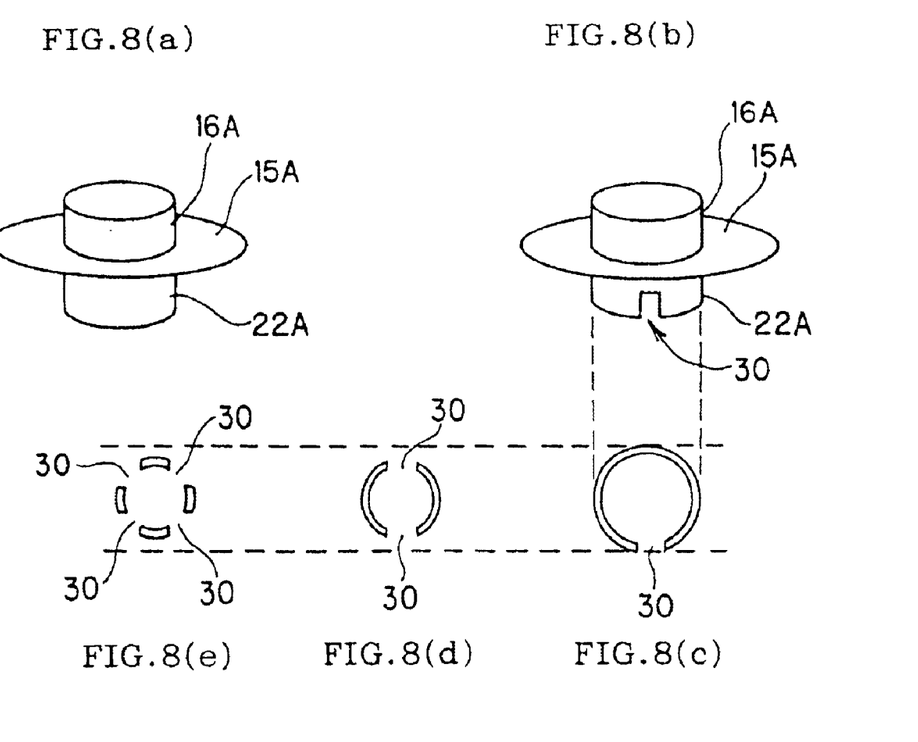

In addition, the lithium secondary battery of the third aspect of the present invention is a lithium secondary battery, which has an internal electrode formed by winding a positive electrode and a negative electrode on an outer periphery wall of the hollow cylindrical winding core and filled with nonaqueous electrolyte solution, a cylindrical battery case containing this internal electrode body inside with its both ends being open, and electrode caps which have sealed the above described internal electrode body at both open ends of this battery case, and the electrode caps are configured to be formed in approximately rotary symmetry around the center axis of the battery case. As in the first and the second aspect of the invention, if the electrode cap comprises a pressure release hole in a position of corresponding with the center axis of the winding core, the winding core is disposed on the center axis of the battery case, and the pressure release hole is structured to be integrated with the external terminal, and the pressure release hole is used in common as the electrolyte solution inlet, as shown in FIG. 8(a), the electrode cap will be able to be formed in approximately rotary symmetry around the center axis of the battery case.

In the lithium secondary battery, in order to accelerate penetration of the solution into the internal electrode body in the injection operation of the electrolyte solution, the electrolyte solution might be poured from the upper portion of the internal electrode body. In this case, as shown in FIG. 8(b), the electrode cap preferably has a slits 30 formed by providing slits in the internal electrode portion. The number of these slits can, as shown in FIGS. 8(c), 8(d), and 8(e), be provided corresponding with necessity, and there is no limitation on its number or position. Here, approximately rotary symmetry of the electrode cap in the present invention has a broad meaning, including complete rotary symmetry to the one in which a slit is formed as shown in FIG. 8(b).

Since the electrode cap in the third aspect of the invention is formed in rotary symmetry and thus rotary processing such as a lathe, etc. will be able to form the electrode cap with its rotary axis being the center, the manufacture will become easy and the processing costs can be largely reduced.

In addition, a manufacturing method of the lithium secondary battery of the fourth aspect of the present invention is a method of manufacturing a lithium secondary battery which contains the internal electrode body in the battery case and is sealed with an electrode cap, wherein a plate-like member having function as a cap after production, an elastic body, a metal foil and a spacer which are processed in advance to a predetermined size, and the above described elastic body and the above described metal foil are disposed in a predetermined position, and are combined with the above described spacer to form a pressure release hole unit, and then the produced electrode cap is used by fitting the above described pressure release hole unit into the above described plate-like member. This serves to make it possible to complete the pressure release hole by only fitting the pressure release hole unit into the electrode cap and to plan improvement in productivity of the lithium secondary battery.

The present invention includes a lithium secondary battery in which the pressure release valve is used as a safety mechanism for burst prevention of the battery. Accordingly, there is no limitation on other materials or battery structure. Main members comprising the battery and their structures will be generally described as follows.

One of structures of the electrode body that can be referred to as the heart of the lithium secondary battery is the single cell structure as seen in a small-capacity coin cell in which each of positive and negative electrode active substances are press-molded into a disk form to sandwich a separator.

In contrast with the small-capacity battery such as a coin cell, one of structures of the electrode body to be used for a large-capacity battery is a wound type. As shown in the perspective view of FIG. 12, a wound-type electrode body 1 is configured by winding a positive electrode plate 2 and a negative electrode plate 3 through separator 4 of porous polymer around the outer periphery of the winding core 13 so that the positive electrode plate 2 and the negative electrode plate 3 are not brought into direct contact with each other. The number of lead lines 5 and 6 attached to the positive electrode plate 2 and the negative electrode plate 3 (hereinafter to be described as "electrode plates 2 and 3") may be at least one, and a plurality of lead lines can make electricity collection resistance small.

Figure 13:
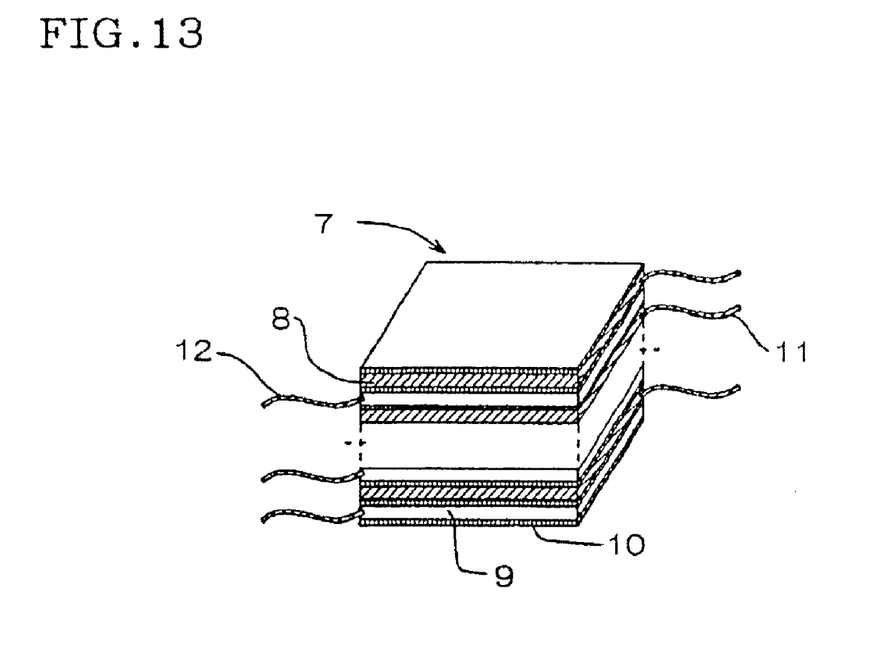
FIG. 13 is a perspective view showing structure of a lamination-type electrode body.

Another structure of the electrode body is a lamination type, which is configured by laminating a plurality of layers of single cell type electrode bodies used for a coin cell. As shown in FIG. 13, a lamination-type electrode body 7 comprises positive electrode plates 8 and negative electrode plates 9 each having predetermined forms and separators 10, the positive electrode plates 8 and the negative electrode plates 9 being laminated through the separators alternately, and at least one electrode lead 11 or 12 is attached to each sheet of electrode plates 8 and 9. Materials to be used, and the producing method, etc. for the electrode plates 8 and 9 are similar to those in the electrode plates 2 and 3, etc. for the wound-type electrode body 1.

Figure 12:
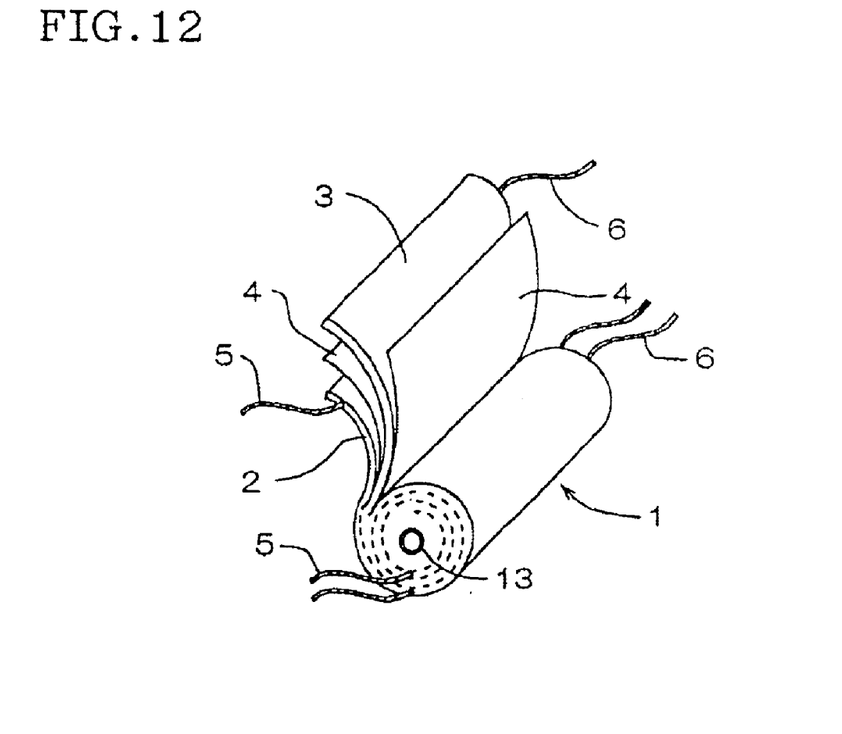
FIG. 12 is a perspective view showing structure of a wound-type electrode body.

Next, with the wound-type electrode body 1 as an example, its configuration will be described further in detail. The positive electrode plate 2 is produced by applying positive active substance onto the both surfaces of the electricity collection substrate. As the electricity collection substrate, a metal foil such as an aluminum foil or a titanium foil, etc., which is good in corrosion resistance against positive electrochemical reaction, is used, but other than foils, punching metal or mesh may be used. In addition, as the positive active substance, a lithium transition metal compound oxide such as lithium manganese oxide ($LiMn_2O_4$), lithium cobalt oxide ($LiCoO_2$), lithium nickel oxide ($LiNiO_2$) are suitably used, and preferably carbon powder such as acetylene black and the like are added to these as conduction assistant agent.

Coating of the positive active substance is implemented by applying to the electricity collection substrate and drying a slurry or a paste, which was produced by adding a solvent and bonding agent, etc. to the powdered positive active substance, and thereafter corresponding with necessity, press processing, etc. is implemented.

The negative electrode plate 3 can be produced similarly as in the positive electrode plate 2. As the electricity collection substrate of the negative electrode plate 3, copper foil or nickel foil, etc., which is good in corrosion resistance against negative electrochemical reaction, is suitably used. As the negative active substance, an amorphous carbon material such as soft carbon or hard carbon, or carbon powder such as artificial graphite, natural graphite or highly graphitized carbon material are used.

As a material of the separator 4, it is suitable to use a three-layer structural material in which a polyethylene film (PE film) having $Li^+$ permeability and including micropores is sandwiched between porous polypropylene films (PP films) having $Li^+$ permeability. This serves also as a safety mechanism in which when the temperature of the electrode body is raised, the PE film is softened at about 130° C. so that the micropores are collapsed to suppress the movement of $Li^+$, that is, the battery reaction. And, when the PE film is sandwiched between the PP films having a softening temperature higher than that of the PE film, the PP films maintain their original shape even if the PE film is softened, thereby preventing the contact/short-circuit between the positive electrode plate 2 and the negative electrode plate 3 so as to enable certain suppression of the battery reaction and reservation of safety.

At the time of winding operation on these electrode plates 2 and 3 and the separator 4, the electrode leads 5 and 6 are respectively attached to the portions where the electricity collection substrates are exposed without any electrode active substances being applied onto the electrode plates 2 and 3. For the electrode leads 5 and 6, foil-like ones made of the same quality as for the electricity collection substrate of the respective electrode plates 2 and 3 are suitable used. The electrode leads 5 and 6 can be attached to the electrode plates 2 and 3 by ultrasonic welding or spot welding, etc. At this time, as shown in FIG. 12, attachment of the respective electrode leads 5 and 6 is carried out so that the electrode lead of one of the electrodes is disposed in one end surface of the electrode body 1, and thus contact between the electrode leads 5 and 6 can be prevented, which is preferable.

For assembly of the battery, at first, conductivity between the terminals to extract currents to outside and the electrode leads 5 and 6 is secured while the produced electrode body 1 is inserted into the battery case and is held in a stable position. Thereafter, after they are filled with the nonaqueous electrolyte solution, the battery case is sealed, and thus the battery is produced.

Next, the nonaqueous electrolyte solution to be used in the lithium secondary battery of the present invention will be described. As a solvent, a single solvent or a mixture solvent of ester system ones such as ethylene carbonate (EC), diethyl carbonate (DEC), dimethyl carbonate (DMC) and propylene carbonate (PC), γ-butyrolactone, tetrahydrofuran, and acetonitrile, etc., are suitably used.

As the lithium compound to be dissolved into such solvent, that is, an electrolyte, lithium fluoride complex compound such as hexafluoride lithium phosphate ($LiPF_6$), lithium fluoroborate ($LiBF_4$), etc. or lithium halide such as lithium perchlorate ($LiClO_4$) can be used, and one or more kinds are dissolved into the above described solvent for use. In particular, it is preferable that $LiPF_6$ is used, which hardly causes oxidation decomsition and involves electrolyte solution with high conductivity.

EXAMPLES

The present invention will be described further in detail based on examples as follows, but the present invention shall not be limited to these examples.

Examples 1 to 4, Comparative Examples 1 to 4

A battery related to the examples 1 to 4 and the comparative examples 1 to 4 has a wound-type electrode body fabricated with a positive electrode plate produced by coating the positive agent slurry with $LiMn_2O_4$ spinel as a positive active substance to which acetylene black as a conductive assistant agent at an external ratio of 4% by weight was added and moreover a solvent and a binder were added to the both surfaces of the aluminum foil of thickness 20 μm to make thickness of approximately 100 μm respectively and a negative electrode plate produced by coating carbon powder as a negative active substance to the both surfaces of the copper foil of thickness 10 μm to make thickness of approximately 80 μm respectively in addition to the similar method hereof, and after it is contained in a battery case of outer diameter of 50 mmφ, nonaqueous electrolyte solution in which $LiPF_6$ as an electrolyte was dissolved into the equal volume mixture solvent of EC and DEC at concentration of 1 mol/l was filled. Incidentally, an Al pipe was used as the winding core, and ethylene propylene rubber with thickness of 1 mm was used as packing for production.

The results of assessment with the later described nail piercing test in the above described examples and comparative examples will be shown in Table 1. Here, production was carried out by adjusting the battery capacities in the examples 1 to 4 as well as the comparative examples 1 to 4 so as to give rise to difference in capacity by changes in the width of the electrode plate. Diameter of the pressure release hole and the inner diameter as well as thickness of the winding core at this time are as shown in Table 1. In addition, other members and the test environment were made same in all the test samples.

The nail piercing test carried out here is the one according to stipulations set by Japan Storage Battery Association, and as a mechanical test (erroneous use test) of a lithium secondary battery safety estimation guideline, is a test to confirm that the battery does not burst, does not fire and that the safety can be secured even if an abnormal discharge current abruptly flows by an internal short circuit of electrodes which is caused by driving a nail (metal rod) in a surface (lamination surface) so that the nail pierces vertically electrode plates of a lithium secondary battery, which is fully charged in the charging capacity, the electrode plates being overlapped with each other on the surface.

TABLE 1

|  | Pressure release hole diameter (mm) | Pressure release hole's opening portion's area $S_1$ (cm$^2$) | winding core inner diameter (mm) | Winding core's center center hollow sectional area $S_2$ (cm$^2$) | Winding core's thickness (mm) | Battery capacity C (Ah) | $S_1/C$ (cm$^2$/Ah) | $S_2/C$ (cm$^2$/Ah) | Nail piercing test results |
|---|---|---|---|---|---|---|---|---|---|
| Example 1 | 7.0 | 0.38 | 9.0 | 0.64 | 1.0 | 16 | 0.024 | 0.040 | ○ |
| Example 2 | 7.0 | 0.38 | 9.0 | 0.64 | 1.0 | 8 | 0.048 | 0.080 | ○ |
| Example 3 | 7.0 | 0.38 | 9.0 | 0.64 | 0.8 | 16 | 0.024 | 0.040 | ○ |
| Example 4 | 7.0 | 0.38 | 7.0 | 0.38 | 1.0 | 16 | 0.024 | 0.024 | ○ |
| Comparative example 1 | 7.0 | 0.38 | 9.0 | 0.64 | 0.5 | 16 | 0.024 | 0.040 | X |
| Comparative example 2 | 7.0 | 0.38 | 5.0 | 0.20 | 1.0 | 16 | 0.024 | 0.013 | X |
| Comparative example 3 | 5.0 | 0.20 | 9.0 | 0.64 | 1.0 | 16 | 0.013 | 0.040 | X |
| Comparative example 4 | 5.0 | 0.20 | 9.0 | 0.64 | 1.0 | 8 | 0.025 | 0.080 | X |

As for assessment of the nail piercing test, a hundred batteries were respectively fabricated and firing as well as occurrence of burst in the portions other than the pressure release hole were observed so that the pressure release hole operation was assessed. In Table 1, the symbol x denotes a case where firing or occurrence of burst in the portions other than the pressure release hole was observed for even one battery while the symbol ○ denotes the pressure release hole operated and the electrolyte solution's vapor was released from the pressure release hole for all 100 batteries.

Assessment

As apparent from Table 1, in the comparative examples 2, 3 and 4 in which the sectional area of the pressure release hole and the sectional area of the winding core's center hollow portion are not more than 0.3 (cm$^2$), firing in the batteries and bursts in the portions other than the pressure release hole were observed. Among them, as for the comparative example 2 the values given by dividing the pressure release hole's sectional area by the internal electrode body's battery capacity is smaller than 0.02, and as for the comparative example 3 the values given by dividing the winding core's center hollow portion's sectional area by the internal electrode body's battery capacity was smaller than 0.02, but as in the comparative example 4, even if those values are both larger than 0.02, the pressure release hole's sectional area not more than 0.3 cm$^2$ resulted in occurrence of burst of the battery to be observed.

In addition, as for the comparative example 2 in which the pressure release hole's sectional area is larger than the winding core's center hollow portion's sectional area, observation by decomposing the battery after nail piercing revealed occurrence of movement of the internal electrode body.

Moreover, as for the comparative example 1 in which the winding core's thickness is smaller than 0.8 mm, observation on the batteries after the test was carried out revealed that the winding core was crushed in the nail piercing portion to block the winding core's center hollow portion. Thus, the gas flow from the side where no pressure release holes are provided was cut off, resulting in a burst.

In addition, in the cases of examples 1 to 4 where the pressure release hole's sectional area and the winding core's center hollow portion's sectional area are larger than 0.3 cm$^2$, but the pressure release hole's sectional area is not more than the winding core's center hollow portion's sectional area, and both of the pressure release hole's sectional area and the winding core's center hollow portion's sectional area toward the battery capacity are larger than 0.02, the pressure release function operated normally, and could release out the electrolyte solution vapor swiftly without finding any battery's firing or bursts, etc.

So far, the present invention is an invention in a lithium secondary battery using the wound-type electrode body, but it goes without saying that the present invention will not concern about battery structures other than that. Other configuring conditions of such a lithium secondary battery of the present invention are suitably adopted for the one with the battery capacity of not less than 2 Ah. In addition, it goes without saying that there will be no limitation on use of the battery, which, however, can be suitably used in particular for the engine starter, and for electric vehicles or for hybrid electric vehicles as a large capacity battery to be mounted on vehicles requiring a large current discharge.

As having been described so far, the lithium secondary battery of the present invention can provide a lithium secondary battery in which improvement in safety and productivity has been planned by disposing a pressure release hole in an electrode cap in a position corresponding with the center axis of the winding core, and improving pressure release performance and assembly operation performance of the pressure release valve.

In addition, the method to manufacture a lithium secondary battery of the present invention adopts simple structure on the electrode cap so that production is simple and improvement in productivity can be planned.

What is claimed is:

1. A lithium secondary battery comprising:
    an internal electrode formed by winding a positive electrode and a negative electrode on an outer peripheral wall of a hollow cylindrical winding core;
    a cylindrical battery case containing the internal electrode body inside with both ends thereof being open;
    nonaqueous electrolyte solution contained in said case and contacting said positive electrode and said negative electrode; and
    electrode caps having battery caps, internal terminals, and external terminals, said battery caps sealing said internal electrode body at both open ends of the battery case, at least one of said battery caps having a pressure release hole in a position corresponding with a center axis of said winding core,
    wherein a pressure release valve is disposed on an internal peripheral wall of said pressure release hole or at the end of said pressure release hole, said pressure release valve comprising an elastic body, a metal foil and a spacer, said elastic body and said metal foil being brought into pressure contact with said spacer to seal said battery case, and
    wherein stress applied to said elastic body is not less than 980 kPa and not more than a force at which said elastic body maintains elasticity of not less than 95%.

2. The lithium secondary battery according to claim 1, wherein said metal foil is formed so as to have a surface pressure of not less than 980 kPa.

3. The lithium secondary battery according to claim 1, wherein said spacer is formed with a metal material having a Young's modulus not less than 170 Gpa.

4. The lithium secondary battery according to claim 1, wherein said spacer is a ring member or a ring member having stopper structure in order that stress of less than a constant amount will be applied to said elastic body.

5. The lithium secondary battery according to claim 1, wherein said metal foil is made of Al, Cu or Ni, said metal foil being coated by fluoride resin.

6. The lithium secondary battery according to claim 1, wherein said elastic body is packing processed in advance to a predetermined size.

7. The lithium secondary battery according to claim 6, wherein said packing is made of ethylene propylene rubber, polyethylene, polypropylene or fluoride resin.

8. The lithium secondary battery according to claim 1, which has a battery capacity of not less than 2 Ah.

9. The lithium secondary battery according to claim 1, which is a battery to be mounted on vehicles.

10. The lithium secondary battery according to claim 9, which is for an engine starter.

11. The lithium secondary battery according to claim 9, which is used in an electric vehicle or a hybrid electric vehicle.

12. A method of manufacturing a lithium secondary battery, which comprises:
    preparing plate-like members functioning as caps after production, elastic bodies, metal foils and spacers which are processed in advance to a predetermined size;
    disposing each said elastic body and each said metal foil in predetermined positions;

combining each said elastic body and each said metal foil with a said spacer to form a pressure release hole unit;

fitting each said pressure release hole unit into a said plate-like member to produce electrode caps;

positioning an internal electrode body in a battery case; and sealing the battery case with said electrode caps, wherein stress applied to said elastic body is not less than 980 kPa and not more than a force at which said elastic body maintains elasticity of not less than 95%.

* * * * *

UNITED STATES PATENT AND TRADEMARK OFFICE
CERTIFICATE OF CORRECTION

PATENT NO.  : 6,866,961 B2  Page 1 of 1
DATED       : March 15, 2005
INVENTOR(S) : Akio Enomoto et al.

It is certified that error appears in the above-identified patent and that said Letters Patent is hereby corrected as shown below:

Drawings,
Please replace Fig. 7 with Fig. 7(a) and 7(b), as shown below:

Signed and Sealed this

Seventeenth Day of January, 2006

JON W. DUDAS
*Director of the United States Patent and Trademark Office*